L. B. TEBBETTS 2D.
COMPOSITE METAL.
APPLICATION FILED JULY 1, 1911.
1,029,152.
Patented June 11, 1912.
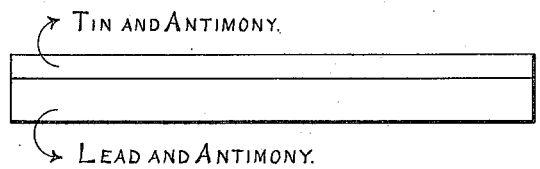
WITNESSES
W. E. Allen
Charles Lowell Howard.
INVENTOR
Lewis B. Tebbetts, 2nd
BY Knight & Cook Attorneys

UNITED STATES PATENT OFFICE.

LEWIS B. TEBBETTS, 2D, OF ST. LOUIS, MISSOURI, ASSIGNOR OF ONE-HALF TO HOYT METAL COMPANY, OF ST. LOUIS, MISSOURI, A CORPORATION OF MISSOURI.

COMPOSITE METAL.

1,029,152.          Specification of Letters Patent.          Patented June 11, 1912.

Application filed July 1, 1911. Serial No. 636,517.

*To all whom it may concern:*

Be it known that I, LEWIS B. TEBBETTS, 2d, a citizen of the United States of America, residing in the city of St. Louis and State of Missouri, have invented certain new and useful Improvements in Composite Metals, of which the following is a full, clear, and exact description, reference being had to the accompanying drawing, forming a part of this specification.

My invention relates to a composite metal of the kind that commonly enters into the manufacture of inexpensive toilet ware, such as brush backs, hand mirror frames, and the like, and into hollow ware, and it has for its object the production of a composite metal to be used in lieu of Britannia metal and which may be produced at a less expense than Britannia or similar metals. Metals of this kind have usually consisted of an alloy in which tin was present in a large percentage throughout the product, and manufacturers have, in view of the expensiveness of tin, endeavored to substitute lead for the tin with the intention of cheapening the product. In such attempts they have tried to give necessary stiffness and hardness to the lead by the combination therewith of small percentages of antimony. The efforts of such manufacturers have not, according to my knowledge, proven in any degree satisfactory, for the reason that when antimony has been used in such percentage as to afford the requisite hardness and stiffness in the composition metal, it has rendered the metal of such brittleness as to break and crack when subjected to pressure in dies, or spun to produce desirable configurations thereon or therein in making the metal into such shapes as are usually required or desired in manufacturing articles from it. By my improvement, I produce a composite metal that is of multiple ply structure and in which there is a facing layer composed of elements of the description used in Britannia metal, and a backing layer that is composed in the main of lead with which is combined a hardening or stiffening element, this backing layer by its incorporation with the facing layer serving to materially diminish the cost of the metal product.

The facing layer of my multiple ply composite metal is composed of tin and antimony, to which may be added copper and nickel, these elments being used in the following proportions, to-wit: Tin, from 86% to 97%, antimony, from 3% to 14%, copper, from 0% to 5%, nickel, from 0% to 2%. While I in some instances include copper and nickel in the above composition, I desire it understood that these elements are not essential and may be dispensed with.

The backing layer of my composite metal is composed of lead, antimony, and tin used in the following proportions, to wit: Lead, from 70% to 96%, antimony, from 4% to 15%, tin, from 0% to 15%. In the backing metal, only the lead and antimony are essential and the tin may, in some instances, be dispensed with.

It is to be particularly noted that in the facing layer of my composite metal, the main metal is tin and the other essential component of the alloy in such layer is antimony, necessary for the purpose of hardening the tin in order that the alloy may be of desired stiffness.

In the backing layer of my composite metal, the main element is lead with the other essential element—antimony—utilized in such layer to give rigidity and stiffness to the alloy. I prefer in some instances to utilize the element tin in the backing layer for the reason that this metal, when used, imparts toughness to the alloy in the backing layer and compensates in a large measure for the brittleness of the antimony present in such layer, thereby making it possible to work the metal more satisfactorily, especially in instances where the metal is drawn to any great degree in producing articles of manufacture therefrom.

It is to be particularly observed that the facing layer or ply of my composite metal contains elements similar to those present in Britannia metal and that this facing layer or ply does not contain lead and antimony in combination; hence, the objectionable brittleness herein mentioned as resulting from such a combination is not present in the facing layer or ply. The desired cheapening of the metal is derived by including lead in the backing layer or ply hardened or stiffened by the combination of antimony therewith, and inasmuch as the backing is not intended to be exposed in articles made from the metal, the presence or cracks therein resulting from the brittleness of the lead-antimony alloy is not objectionable.

I claim:

1. In a composite metal, a facing layer containing tin and a hardening and stiffening agent, and a backing layer containing lead and a hardening and stiffening agent.

2. In a composite metal plate, a facing layer containing tin and antimony, and a backing layer containing lead and antimony.

3. In a composite metal, a facing layer comprising from eighty-six per cent. to ninety-seven per cent. of tin, from three per cent. to fourteen per cent. of antimony, from naught to five per cent. of copper, from naught to two per cent. of nickel, and a backing layer comprising from seventy per cent. to ninety-six per cent. of lead, from four per cent. to fifteen per cent. of antimony, and from naught to fifteen per cent. of tin.

LEWIS B. TEBBETTS, 2D.

In the presence of—
A. J. McCauley,
E. B. Linn.